US012573394B2

(12) United States Patent
Ishimaru et al.

(10) Patent No.: US 12,573,394 B2
(45) Date of Patent: Mar. 10, 2026

(54) ESTIMATION METHOD, RECORDING MEDIUM, AND ESTIMATION DEVICE

(71) Applicant: Panasonic Intellectual Property Management Co., Ltd., Osaka (JP)

(72) Inventors: Masashi Ishimaru, Osaka (JP); Yoshihiro Matsumura, Osaka (JP); Hiroki Kamei, Osaka (JP); Jakusei Kiyosaki, Hyogo (JP); Yaming Zhang, Osaka (JP); Yuki Kunugida, Osaka (JP); Takuya Yamamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 190 days.

(21) Appl. No.: 18/292,214

(22) PCT Filed: Jul. 19, 2022

(86) PCT No.: PCT/JP2022/028072
§ 371 (c)(1),
(2) Date: Jan. 25, 2024

(87) PCT Pub. No.: WO2023/013402
PCT Pub. Date: Feb. 9, 2023

(65) Prior Publication Data
US 2025/0095644 A1 Mar. 20, 2025

(30) Foreign Application Priority Data
Aug. 6, 2021 (JP) .................................. 2021-130009

(51) Int. Cl.
*G10L 15/22* (2006.01)
*G10L 25/51* (2013.01)

(52) U.S. Cl.
CPC .............. *G10L 15/22* (2013.01); *G10L 25/51* (2013.01); *G10L 2015/225* (2013.01)

(58) Field of Classification Search
CPC ... G10L 15/22; G10L 25/51; G10L 2015/225; G10L 21/003; G10L 25/66; A61B 5/16; A61B 5/4803; A61B 5/7267; A61B 10/00
See application file for complete search history.

(56) References Cited

U.S. PATENT DOCUMENTS

| 12,033,621 B2 * | 7/2024 | Su ......................... G10L 15/005 |
| 2013/0238336 A1 * | 9/2013 | Sung ...................... G10L 15/32 704/255 |

(Continued)

FOREIGN PATENT DOCUMENTS

| JP | 6268628 B2 | 1/2018 |
| JP | 6312014 B2 | 4/2018 |

(Continued)

OTHER PUBLICATIONS

International Search Report dated Oct. 18, 2022 issued in International Patent Application No. PCT/JP2022/028072, with English translation.

*Primary Examiner* — Mark Villena
(74) *Attorney, Agent, or Firm* — Rimon P.C.

(57) ABSTRACT
An estimation method includes: obtaining a first voice feature group of a plurality of persons who speak a first language; obtaining a second voice feature group of a plurality of persons who speak a second language; obtaining a voice feature of a subject; correcting the voice feature of the subject according to a relationship between the first voice feature group and the second voice feature group; estimating, from the voice feature of the subject that has been corrected, an oral function or a cognitive function of the subject by using an estimation process for an oral function or a cognitive function based on the second lan-
(Continued)

guage; and outputting a result of estimation of the oral function or the cognitive function of the subject.

11 Claims, 9 Drawing Sheets

(56)                          References Cited

U.S. PATENT DOCUMENTS

| | | | |
|---|---|---|---|
| 2020/0175961 A1* | 6/2020 | Thomson | G10L 15/063 |
| 2020/0229752 A1 | 7/2020 | Sumi et al. | |
| 2020/0261014 A1 | 8/2020 | Sumi et al. | |
| 2020/0335083 A1* | 10/2020 | Wan | G06N 3/09 |
| 2020/0349923 A1* | 11/2020 | Hu | G10L 15/193 |
| 2021/0027766 A1* | 1/2021 | Shi | G10L 15/063 |
| 2021/0177340 A1 | 6/2021 | Sumi et al. | |
| 2021/0233660 A1 | 7/2021 | Omiya et al. | |
| 2022/0405471 A1* | 12/2022 | Kogan | G06F 40/30 |
| 2023/0000427 A1 | 1/2023 | Matsumura et al. | |

FOREIGN PATENT DOCUMENTS

| | | | |
|---|---|---|---|
| JP | 6337362 | B2 | 6/2018 |
| JP | 6712028 | B2 | 6/2020 |
| JP | 7316596 | B2 | 7/2023 |
| WO | 2019/225241 | A1 | 11/2019 |
| WO | 2020/013302 | A1 | 1/2020 |
| WO | 2022/254973 | A1 | 12/2022 |

* cited by examiner

| Voice feature group | Correction method | Correction expression | | | |
|---|---|---|---|---|---|
| A | No correction | — | | | |
| D | 3 | Japanese_mean -2.153025672 | Japanese_std 0.355037126 | Chinese_mean -1.589782595 | Chinese_std 0.645520591 |
| B | 2 | Japanese_mean 28.28333333 | Japanese_std 4.171696964 | Chinese_mean 15.31428571 | Chinese_std 4.584267685 |

| Chinese | Adjustment value |
|---|---|
| 10.51 | 0.480494767 |
| 14.822 | 0.432026717 |
| 15.538 | 0.442013129 |
| 16.807 | 0.413845422 |
| 17.15 | 0.409795918 |
| 17.885 | 0.396840928 |
| 18.594 | 0.388673766 |
| 19.142 | 0.387211368 |
| 19.69 | 0.382833926 |
| 20.639 | 0.368501381 |
| 20.93 | 0.377448638 |
| 21.329 | 0.392353134 |
| 21.8 | 0.405688073 |
| 22.51 | 0.429653487 |
| 22.624 | 0.45261669 |
| 22.755 | 0.459349593 |
| 23.65 | 0.480169133 |
| 24.233 | 0.508769034 |
| 24.708 | 0.542658248 |
| 26.694 | 0.646512325 |
| 28.76 | 1 |

(Voice feature group C corresponds to Correction method 1, associated with the Chinese / Adjustment value table above.)

ESTIMATION METHOD, RECORDING MEDIUM, AND ESTIMATION DEVICE

CROSS-REFERENCE OF RELATED APPLICATIONS

This application is the U.S. National Phase under 35 U.S.C. § 371 of International Patent Application No. PCT/JP2022/028072, filed on Jul. 19, 2022, which in turn claims the benefit of Japanese Patent Application No. 2021-130009, filed on Aug. 6, 2021, the entire disclosures of which applications are incorporated by reference herein.

TECHNICAL FIELD

The present invention relates to an estimation method, a recording medium, and an estimation device capable of estimating an oral function or a cognitive function.

BACKGROUND ART

It is known that a decline in an oral function or a cognitive function involves a disorder of speech. Specifically, as an oral function or a cognitive function declines, a speech rate decreases, and a pause ratio increases. Patent Literature (PTL) 1 to 3 each disclose a technique for estimating an oral function or a cognitive function, using a voice feature obtained from speech data. These enable estimation of the oral function or the cognitive function.

CITATION LIST

Patent Literature

[PTL 1] Japanese Patent No. 6268628
[PTL 2] Japanese Patent No. 6312014
[PTL 3] Japanese Patent No. 6337362

SUMMARY OF INVENTION

Technical Problem

However, in the techniques disclosed in PTL 1 to 3 described above, an estimation process based on a specific language (e.g., Japanese) is performed. For example, when an oral function or a cognitive function of a person who speaks a language (e.g., Chinese) different from the specific language is estimated, the person is prompted to speak a sentence that produces pronunciations similar to those in the specific language. However, different languages make differences in voice feature even between similar pronunciations, and the accuracy of estimation of the oral function or the cognitive function may decrease.

Thus, an object of the present invention is to provide an estimation method capable of inhibiting a decrease in accuracy of estimation even when an estimation process for an oral function or a cognitive function based on a specific language is applied to a language different from the specific language.

Solution to Problem

An estimation method according to an aspect of the present invention is an estimation method executed by an estimation device that estimates an oral function or a cognitive function, the estimation method including: obtaining a voice feature group of a plurality of persons who speak a first language, by analyzing voices obtained by prompting the plurality of persons who speak the first language to speak a first language sentence that is in the first language and is similar in pronunciation to a second language sentence spoken in a second language different from the first language; obtaining a voice feature group of a plurality of persons who speak the second language, by analyzing voices obtained by prompting the plurality of persons who speak the second language to speak the second language sentence; obtaining a voice feature of a subject who speaks the first language, by analyzing a voice obtained by prompting the subject to speak the first language sentence; correcting the voice feature of the subject according to a relationship between the voice feature group of the plurality of persons who speak the first language and the voice feature group of the plurality of persons who speak the second language; estimating, from the voice feature of the subject that has been corrected, an oral function or a cognitive function of the subject by using an estimation process for an oral function or a cognitive function based on the second language; and outputting a result of estimation of the oral function or the cognitive function of the subject.

In addition, a recording medium according to an aspect of the present invention is a non-transitory computer-readable recording medium having recorded thereon a program for causing a computer to execute the estimation method described above.

In addition, an estimation device according to an aspect of the present invention is an estimation device that estimates an oral function or a cognitive function, the estimation device including: a first voice feature group obtainer that obtains a voice feature group of a plurality of persons who speak a first language, by analyzing voices obtained by prompting the plurality of persons who speak the first language to speak a first language sentence that is in the first language and is similar in pronunciation to a second language sentence spoken in a second language different from the first language; a second voice feature group obtainer that obtains a voice feature group of a plurality of persons who speak the second language, by analyzing voices obtained by prompting the plurality of persons who speak the second language to speak the second language sentence; a subject voice feature obtainer that obtains a voice feature of a subject who speaks the first language, by analyzing a voice obtained by prompting the subject to speak the first language sentence; a corrector that corrects the voice feature of the subject according to a relationship between the voice feature group of the plurality of persons who speak the first language and the voice feature group of the plurality of persons who speak the second language; an estimator that estimates, from the voice feature of the subject that has been corrected, an oral function or a cognitive function of the subject by using an estimation process for an oral function or a cognitive function based on the second language; and an outputter that outputs a result of estimation of the oral function or the cognitive function of the subject.

Advantageous Effects of Invention

With the estimation method and so on according to the present invention, it is possible to inhibit a decrease in accuracy of estimation even when an estimation process for an oral function or a cognitive function based on a specific language is applied to a language different from the specific language.

BRIEF DESCRIPTION OF DRAWINGS

FIG. 4 is a block diagram illustrating a characteristic functional configuration of an estimation device according to the embodiment.

FIG. 9 is a table showing an example of the correction expression for matching the distribution of a voice feature group of a plurality of persons who speak Chinese to the distribution of a voice feature group of a plurality of persons who speak Japanese for each of the types of voice features.

DESCRIPTION OF EMBODIMENTS

Figure 1:
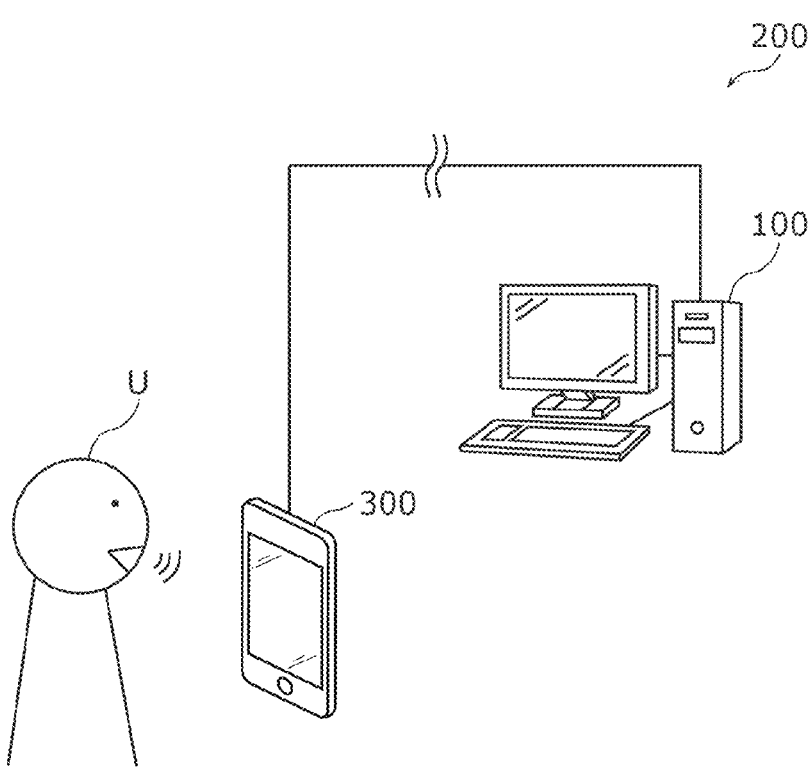
FIG. 1 is a diagram illustrating a configuration of an estimation system according to an embodiment.

Hereinafter, embodiments will be described with reference to the drawings. It should be noted that the following embodiments each illustrate a general or specific example. The numerical values, shapes, materials, constituent elements, the arrangement and connection of the constituent elements, steps, the processing order of the steps etc. illustrated in the following embodiments are mere examples, and are not intended to limit the present invention. Among the constituent elements in the following embodiments, those not recited in any of the independent claims representing the most generic concepts will be described as optional constituent elements.

It should be noted that the drawings are represented schematically and are not necessarily precise illustrations. Furthermore, in the drawings, constituent elements that are substantially the same are given the same reference signs, and redundant descriptions will be omitted or simplified.

Embodiment

[Configuration of Estimation System]

A configuration of estimation system 200 according to the embodiment will be described.

FIG. 1 is a diagram illustrating a configuration of estimation system 200 according to the embodiment.

Estimation system 200 is a system for estimating an oral function or a cognitive function of subject U, by analyzing a voice of subject U. As illustrated in FIG. 1, estimation system 200 includes estimation device 100 and mobile terminal 300.

Estimation device 100 is a device that obtains voice data indicating a voice spoken by subject U, with mobile terminal 300, and estimates an oral function or a cognitive function of subject U from the voice data obtained.

Mobile terminal 300 is a sound collection device that collects in a contactless manner a voice of subject U speaking a clause or a fixed phrase that includes (i) two or more morae including a change in a first formant frequency or a change in a second formant frequency or (ii) at least one of a vowel, a flap, a plosive, a voiceless consonant, a double consonant, or a fricative, and outputs voice data indicating the collected voice to estimation device 100. For example, mobile terminal 300 is a smartphone or a tablet computer including a microphone. It should be noted that mobile terminal 300 is not limited to a smartphone, a tablet computer, or the like, and may be, for example, a notebook PC so long as it is a device having a sound collecting function. Estimation system 200 may include a sound collection device (a microphone) instead of mobile terminal 300. Estimation system 200 may include an input interface for obtaining personal information on subject U. The input interface is not limited to a particular input interface so long as it has an inputting function, such as a keyboard or a touch panel. The volume of the microphone may be set in estimation system 200.

Mobile terminal 300 may be a display device that includes a display and displays, for example, an image based on image data output from estimation device 100. It should be noted that the display device need not be mobile terminal 300 and may be a monitor device that includes a liquid crystal panel, an organic EL panel, or the like. In other words, although mobile terminal 300 serves as both a sound collection device and a display device in the present embodiment, the sound collection device (microphone), the input interface, and the display device may be provided separately.

Estimation device 100 and mobile terminal 300 may be connected together in either a wired manner or a wireless manner.

Estimation device 100 analyzes voices of subject U based on voice data collected by mobile terminal 300, evaluates an oral function or a cognitive function of subject U from a result of the analysis, and outputs a result of the estimation. For example, estimation device 100 outputs, to mobile terminal 300, image data for displaying an image indicating the result of the estimation or data for providing a suggestion to subject U that is regarding the oral function or the cognitive function and generated based on the result of the estimation. With this configuration, estimation device 100 can notify subject U of a level of an oral function or a cognitive function of subject U and a suggestion for preventing the oral function and the cognitive function from declining, for example. Thus, for example, subject U can prevent the oral function or the cognitive function from declining or improve the oral function or the cognitive function.

Estimation device 100 is, for example, a personal computer. Estimation device 100 may be a server device. Estimation device 100 may be mobile terminal 300. In other words, mobile terminal 300 may have functions of estimation device 100 described below.

For example, estimation device 100 performs an estimation process based on a specific language (e.g., Japanese). Specifically, estimation device 100 performs an estimation process based on a machine learning model that has been built with speech data in the specific language. As a result, when an oral function or a cognitive function of a person who speaks a language (e.g., Chinese) different from the specific language is estimated, the person is prompted to speak a sentence that produces pronunciations similar to those in the specific language. However, different languages make differences in voice feature even between similar pronunciations. Here, differences in voice feature between languages will be described with reference to FIG. 2 and FIG. 3.

Figure 2:
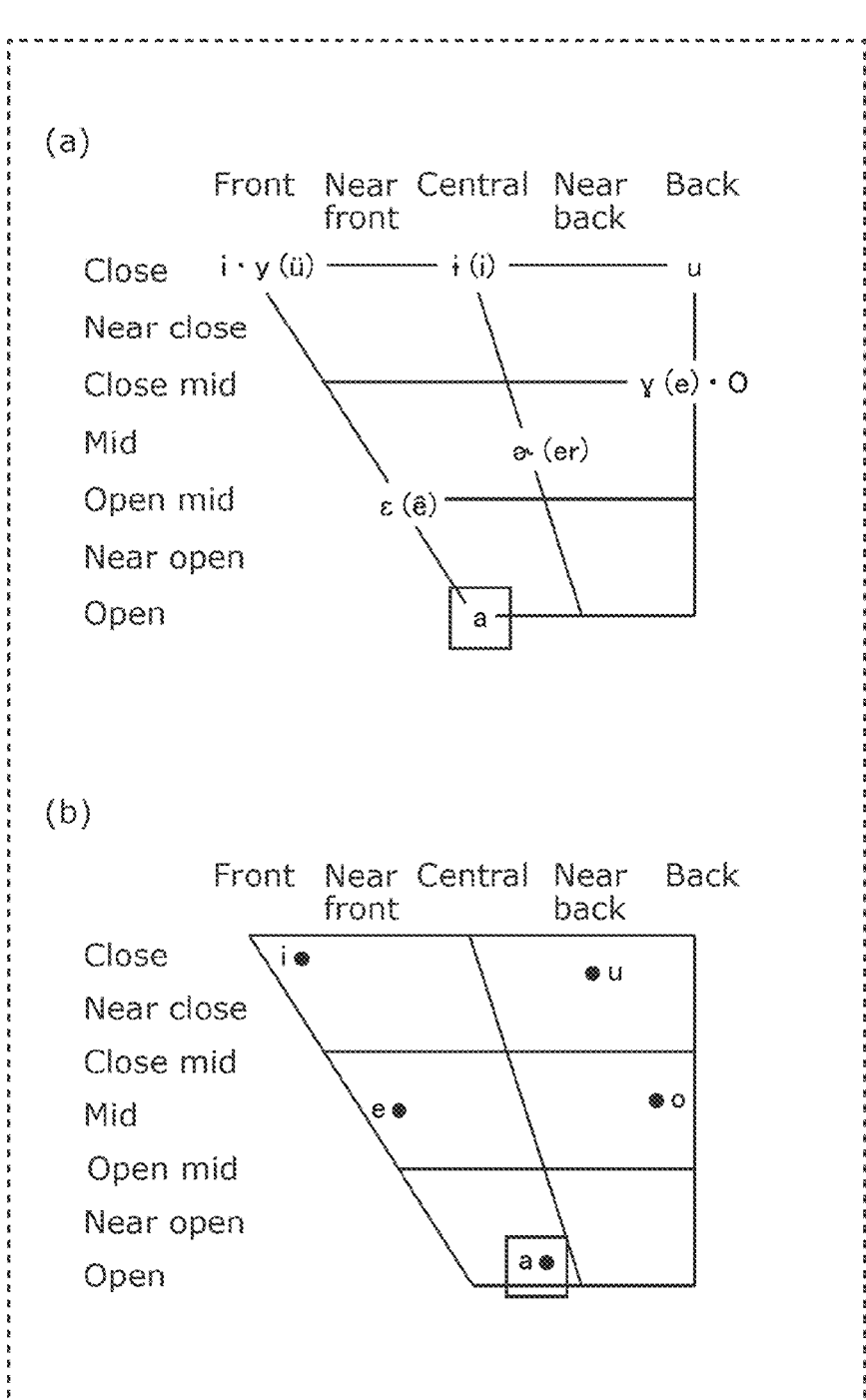
FIG. 2 is a diagram illustrating differences in position for pronouncing vowels between Chinese and Japanese.

FIG. 2 is a diagram illustrating differences in position for pronouncing vowels between Chinese and Japanese. (a) in FIG. 2 shows phonetic alphabet symbols of Chinese vowels, and (b) in FIG. 2 shows international phonetic alphabet symbols of Japanese vowels.

Figure 3:
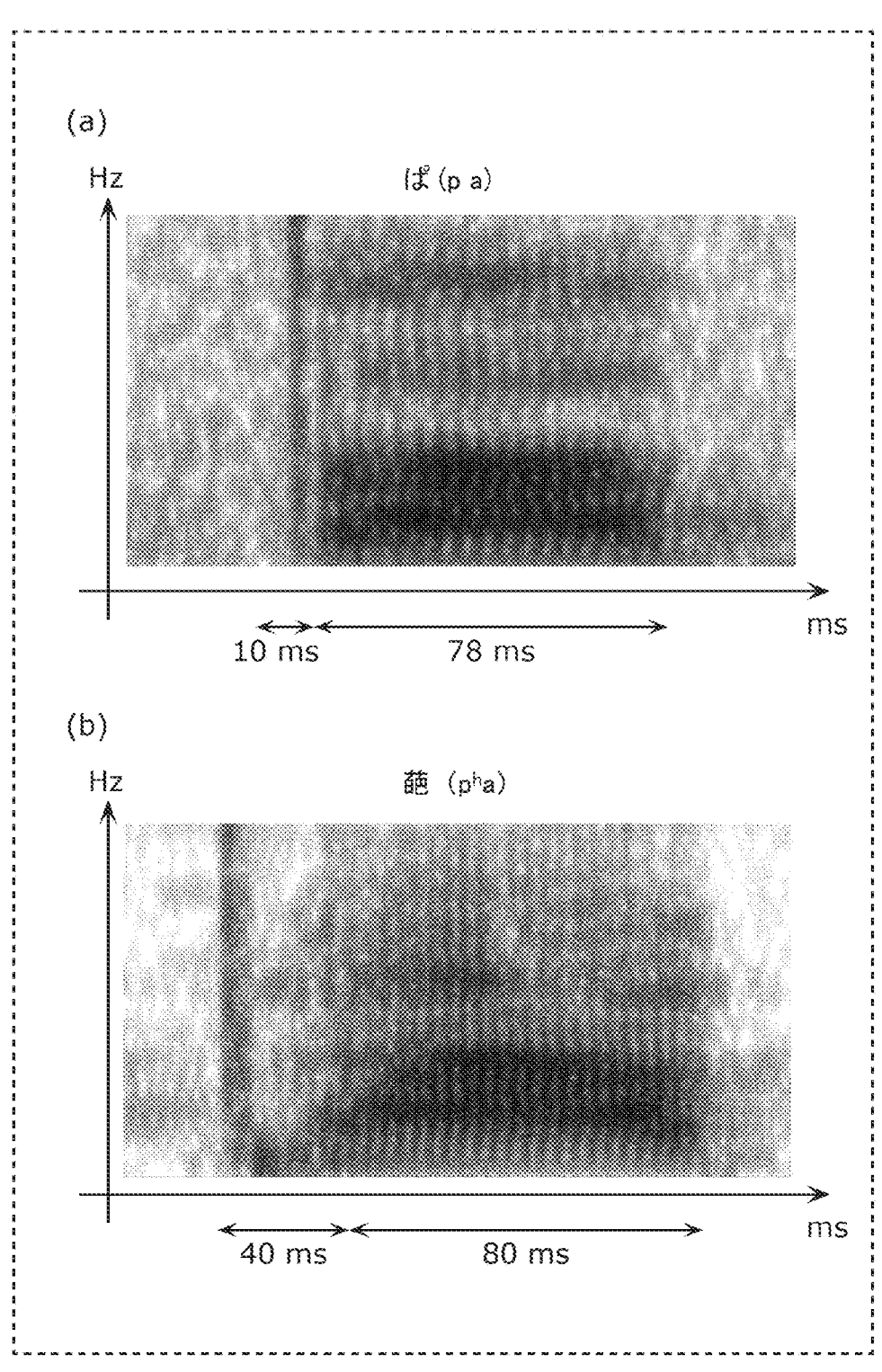
FIG. 3 is a diagram illustrating a difference in time length of a consonant between Chinese and Japanese.

FIG. 3 is a diagram illustrating a difference in time length of a consonant between Chinese and Japanese. (a) in FIG. 3 illustrates a time length of a consonant when "pa" is spoken in Japanese, and (b) in FIG. 3 illustrates a time length of a consonant when "pa" is spoken in Chinese.

In a position relationship of the international phonetic alphabet symbols of vowels illustrated in FIG. 2, a horizontal direction indicates forward-backward movement of a tongue, and a vertical direction indicates a degree of opening of a mouth. As illustrated in (a) in FIG. 2 and (b) in FIG. 2, it is understood that pronunciations of "a" in Chinese and Japanese differ in the forward-backward movement of a tongue and in the degree of opening of a mouth. Thus, pronunciations of similar vowels in Chinese and Japanese differ in formant frequency, ratio between formant frequencies, change in the formant frequency, and the like as voice features.

The consonant part "p" of "pa" in Japanese is an unaspirated sound, and the consonant part "p" of "pa" in Chinese is an aspirated sound. An unaspirated sound and an aspirated sound differ in time length of a consonant part. Therefore, as illustrated in (a) in FIG. 3 and (b) in FIG. 3, it is understood that pronunciations of "pa" in Chinese and "pa" in Japanese differ in time length of a consonant part. Specifically, a time length of a consonant part of "pa" in Japanese is 10 ms, and a time length of a consonant part of "pa" in Chinese is 40 ms. Thus, pronunciations of similar consonants in Chinese and Japanese differ in syllable time length, the number of syllables, change in the syllable time length, and the like as voice features.

For these reasons, if an estimation process for an oral function or a cognitive function based on a specific language is applied to a language different from the specific language, the accuracy of estimation of the oral function or the cognitive function may be decreased by differences in voice features between the different languages. In view of this, in the present invention, an estimation method and estimation device 100 capable of inhibiting a decrease in accuracy of estimation even when an estimation process for an oral function or a cognitive function based on a specific language is applied to a language different from the specific language.

[Configuration of Estimation Device]

Figure 4:
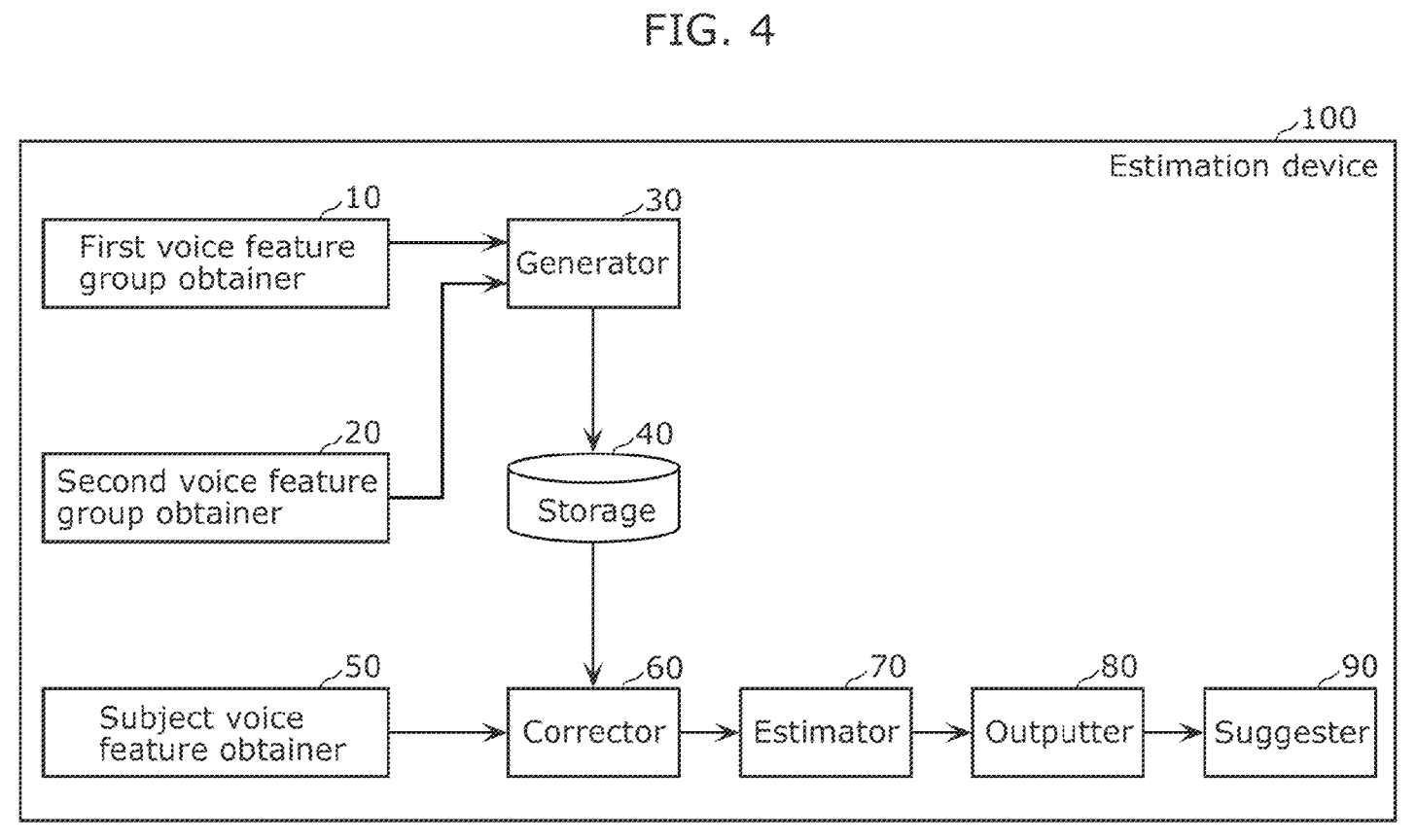

FIG. 4 is a block diagram illustrating a characteristic functional configuration of estimation device 100 according to the embodiment. Estimation device 100 includes first voice feature group obtainer 10, second voice feature group obtainer 20, generator 30, storage 40, subject voice feature obtainer 50, corrector 60, estimator 70, outputter 80, and suggester 90. Estimation device 100 is a computer including a processor, a communication interface, and memory, for example. The memory is, for example, read only memory (ROM), random access memory (RAM), semiconductor memory, or hard disk drive (HDD). A program executed by the processor can be stored in the memory. First voice feature group obtainer 10, second voice feature group obtainer 20, generator 30, subject voice feature obtainer 50, corrector 60, estimator 70, outputter 80, and suggester 90 are implemented using, for example, the communication interface and the processor that executes the program stored in the memory. Storage 40 is implemented using the memory, for example. Storage 40 may be memory different from the memory in which the program is stored.

First voice feature group obtainer 10 obtains a voice feature group (also referred to as a first voice feature group) of a plurality of persons who speak a first language, by analyzing voices obtained by prompting the plurality of persons who speak the first language to speak a first language sentence that is in the first language and is similar in pronunciation to a second language sentence spoken in a second language different from the first language Second voice feature group obtainer 20 obtains a voice feature group (also referred to as a second voice feature group) of a plurality of persons who speak the second language, by analyzing voices obtained by prompting the plurality of persons who speak the second language to speak the second language sentence.

Generator 30 generates a correction expression for matching the distribution of the voice feature group of the plurality of persons who speak the first language to the distribution of the voice feature group of the plurality of persons who speak the second language, according to the relationship between the voice feature group of the plurality of persons who speak the first language and the voice feature group of the plurality of persons who speak the second language. Alternatively, generator 30 generates a trained model for approximating a voice feature of a voice obtained from the first language sentence being spoken to a voice feature of a voice obtained from the second language sentence being spoken, by teaching the relationship between the voice feature group of the plurality of persons who speak the first language and the voice feature group of the plurality of persons who speak the second language.

Storage 40 stores the correction expression or the trained model generated.

Subject voice feature obtainer 50 obtains a voice feature of subject U who speaks the first language, by analyzing a voice obtained by prompting subject U to speak the first language sentence.

Corrector 60 corrects the voice feature of subject U according to the relationship between the voice feature group of the plurality of persons who speak the first language and the voice feature group of the plurality of persons who speak the second language.

Estimator 70 estimates, from the voice feature of subject U that has been corrected, an oral function or a cognitive function of subject U by using an estimation process for an oral function or a cognitive function based on the second language.

Outputter 80 outputs a result of estimation of the oral function or the cognitive function of subject U.

Suggester 90 provides a suggestion regarding the oral function or the cognitive function for subject U by checking the result of estimation against predetermined data. Suggestion data, which is the predetermined data, may be stored in storage 40. Suggester 90 outputs the suggestion to mobile terminal 300.

Estimation device 100 may obtain personal information on subject U. For example, the personal information is information input to mobile terminal 300 and includes an age, a weight, a height, a sex, a body mass index (BMI), dental information (e.g., the number of teeth, presence or absence of denture, an occlusal support location, the number of functional teeth, the remaining number of teeth, etc.), a value of serum albumin, or an eating rate. The personal information may be obtained through a swallowing screening tool called the eating assessment tool-10 (EAT-10), Seirei dysphagia screening questionnaire, interview, Barthel Index, Kihon Checklist, or the like. The personal information may be stored in storage 40. Suggester 90 may also check the personal information against the suggestion data to provide the suggestion regarding the oral function or the cognitive function for subject U. Storage 40 may also store data such as an image, a video, a voice, or a text indicating details of suggestion. In addition, storage 40 may store an instruction image for instructions about pronouncing the clause or fixed phrase.

Although not shown in the figure, estimation device 100 may include an instructor for instructing subject U to speak a clause or a fixed phrase that includes (i) two or more morae including a change in a first formant frequency or a change in a second formant frequency or (ii) at least one of a vowel, a flap, a plosive, a voiceless consonant, a double consonant, or a fricative. Specifically, the instructor obtains image data of an instruction image for instructions about pronouncing the clause or fixed phrase or voice data of an instruction voice stored in storage 40 and outputs the image data or voice data to mobile terminal 300.

[Processing Procedure of Estimation Method]

Subsequently, a specific processing procedure in an estimation method performed by estimation device 100 will be described.

Figure 5:
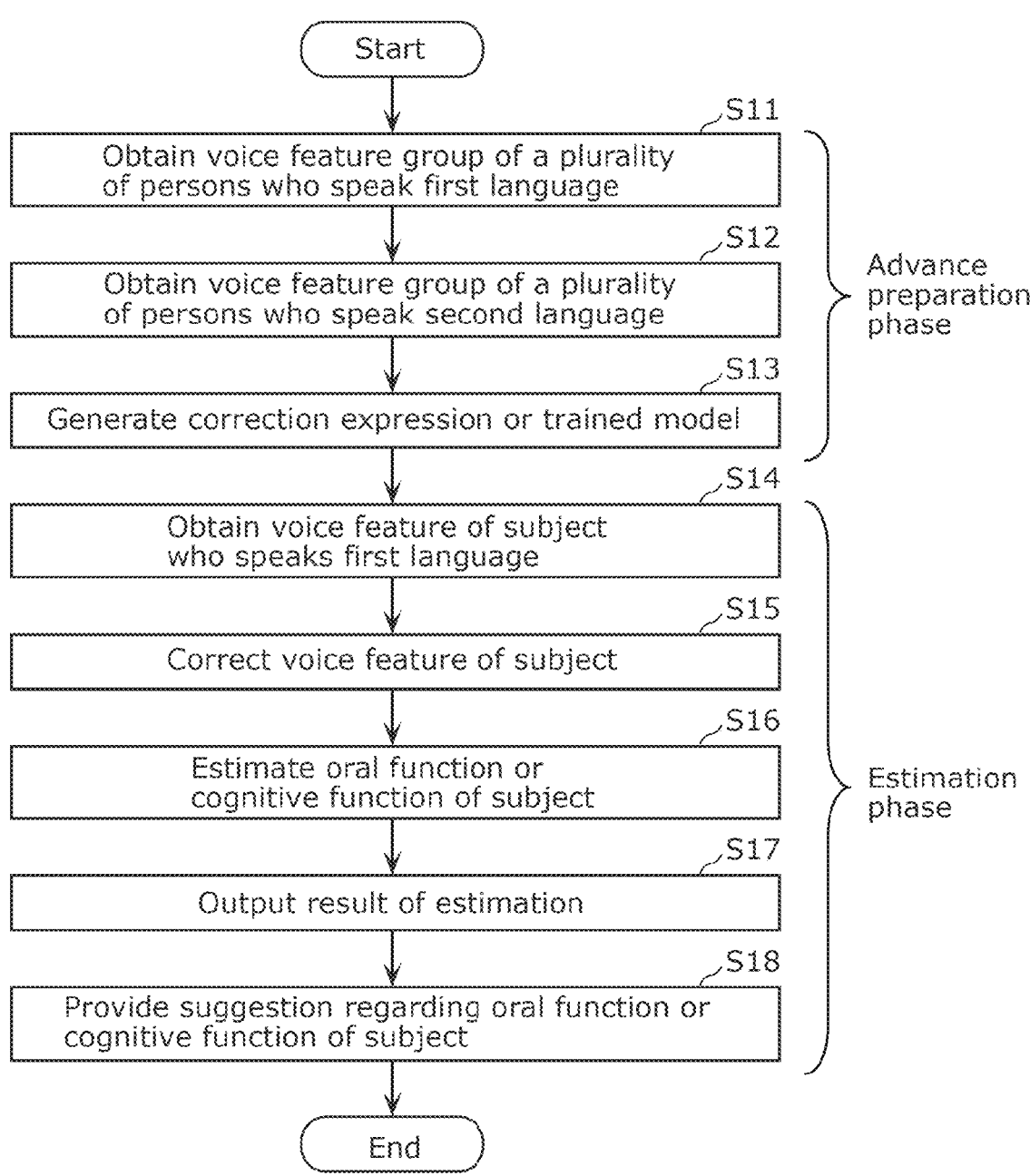
FIG. 5 is a flowchart illustrating a processing procedure for estimating an oral function or a cognitive function of a subject by an estimation method according to the embodiment.

FIG. 5 is a flowchart illustrating a processing procedure for estimating an oral function or a cognitive function of subject U by an estimation method according to the embodiment. As illustrated in FIG. 5, the estimation method includes an advance preparation phase (from step S11 to step S13) and an estimation phase (from step S14 to step S18). In the advance preparation phase, a process for generating correction expressions or a trained model is performed. In the estimation phase, a process for estimating the oral function or the cognitive function of subject U is performed. Since the estimation method is performed by estimation device 100, FIG. 5 is a flowchart illustrating operation of estimation device 100.

First, first voice feature group obtainer 10 obtains a voice feature group of a plurality of persons who speak the first language, by analyzing voices obtained by prompting the plurality of persons who speak the first language to speak a first language sentence (a clause or a fixed phrase) that is in the first language and is similar in pronunciation to a second language sentence (a clause or a fixed phrase) spoken in the second language different from the first language (step S11). As an example of clauses or fixed phrases that are in different languages and include similar pronunciations, Table 1 to Table 4 below are shown, for example.

TABLE 1

| | Vowel \| Opening of mouth (small to large) | Vowel \| Movement of tongue (back to front) |
|---|---|---|
| Japanese | 決めた [kimeta] | 絵を [eo] |
| Chinese | 即刻打 [tɕikʰɤta] | 一五 [iu] |
| English | Entry Pass [entripæs] | Rocky [rɒki] |

TABLE 2

| | Consonant \| Pronunciation positions are the same |
|---|---|
| Japanese | から [kara] |
| Chinese | 卡拉 [kala] |
| English | Color [kʌlə] |

TABLE 3

| | Include stop \| Total numbers of syllables are the same |
|---|---|
| Japanese | 北から来た肩たたき機 [kitakarakitakatatatakiki] |
| Chinese | 他的爸爸比我的爸爸大八歲 [tʰatɤpapapiwotɤpapatapasuei] |

TABLE 4

| | Consonant \| Stop |
|---|---|
| Japanese | ぱぱぱ [papapa] |
| Chinese | 葩葩葩 [pʰapʰapʰa] |

For example, the first language is Chinese, and the second language is Japanese. It should be noted that a combination of the first language and the second language is not limited to Chinese and Japanese. For example, the first language may be English, and the second language may be Japanese. Another combination of languages may be possible.

First voice feature group obtainer 10 obtains a first voice feature group by prompting a plurality of persons who speak the first language (e.g., Chinese) to speak such a first language sentence (e.g., a clause or fixed phrase in Chinese) and analyzing voices of the plurality of persons who speak the first language. Types of voice features obtained include speech rate, sound pressure difference, change over time in the sound pressure difference, formant frequency, ratio between formant frequencies, change in the formant frequency, time length of mouth opening, time length of mouth closure, time length of a plosive, articulation time length, standard deviation of pause time lengths. The types of voice features depend on the details of the first language sentence spoken. First voice feature group obtainer 10 obtains the first voice feature group by, for example, obtaining voice features of dozens of persons as the plurality of persons who speak the first language. For example, first voice feature group obtainer 10 obtains the first voice feature group for each of the types of voice features.

Next, second voice feature group obtainer 20 obtains a voice feature group of a plurality of persons who speak the second language, by analyzing voices obtained by prompting the plurality of persons who speak the second language to speak the second language sentence (step S12). Second voice feature group obtainer 20 obtains the second voice feature group by prompting the plurality of persons who speak the second language (e.g., Japanese) to speak a second language sentence (e.g., a clause or fixed phrase in Japanese) similar to the first language sentence in pronunciation and analyzing voices of the plurality of persons who speak the second language. Types of voice features obtained include speech rate, sound pressure difference, change over time in the sound pressure difference, formant frequency, ratio between formant frequencies, change in the formant frequency, time length of mouth opening, time length of mouth closure, time length of a plosive, articulation time length, standard deviation of pause time lengths. The types of voice features depend on the details of the second language sentence spoken. Second voice feature group obtainer 20 obtains the second voice feature group by, for example, obtaining voice features of dozens of persons as the plurality of persons who speak the second language. For example, second voice feature group obtainer 20 obtains the second voice feature group for each of the types of voice features.

It should be noted that an order of performing step S11 and step S12 is not limited to the order of step S11 and then step S12 and may be the order of step S12 and then step S11.

Next, generator 30 generates a correction expression or a trained model (step S13). Hereafter, a process including step S13 to step S18 for generating the correction expressions is described first, and subsequently, a process including step S13 to step S18 for generating the trained model will be described.

Generator 30 generates a correction expression for matching the distribution of the first voice feature group to the distribution of the second voice feature group according to the relationship between the first voice feature group and the second voice feature group. For example, generator 30 generates three types of correction expressions. First, a first correction expression will be described.

For example, generator 30 sorts the voice features of the plurality of persons included in the first voice feature group in ascending order of their values and divides the voice features into increments of given percent (e.g., divides the voice features into 20 percentile sections in increments of 5%). Likewise, generator 30 sorts the voice features of the plurality of persons included in the second voice feature group in ascending order of their values and divides the voice features into increments of given percent (e.g., divides the voice features into 20 percentile sections in increments of 5%).

Generator 30 then calculates a coefficient (adjustment value) in each of the percentile sections. The coefficient is a value that is a voice feature of the persons who speak the second language divided by a voice feature of the persons who speak the first language in each percentile section. For example, in the case where the voice feature (e.g., a mean of mora time lengths) of persons who speak the first language is 707.5 ms at 5 percentile, and the voice feature (e.g., a mean of mora time lengths) of person who speak the second language is 641.25 ms at 5 percentile, generator 30 calculates 641.25/707.5=0.90636 as a coefficient for a percentile section that is greater than 5 percentile and less than or equal to 10 percentile. It should be noted that a coefficient for a percentile section in which the voice feature of the person who speaks the first language is 0 may be set to 1.

Figure 6:
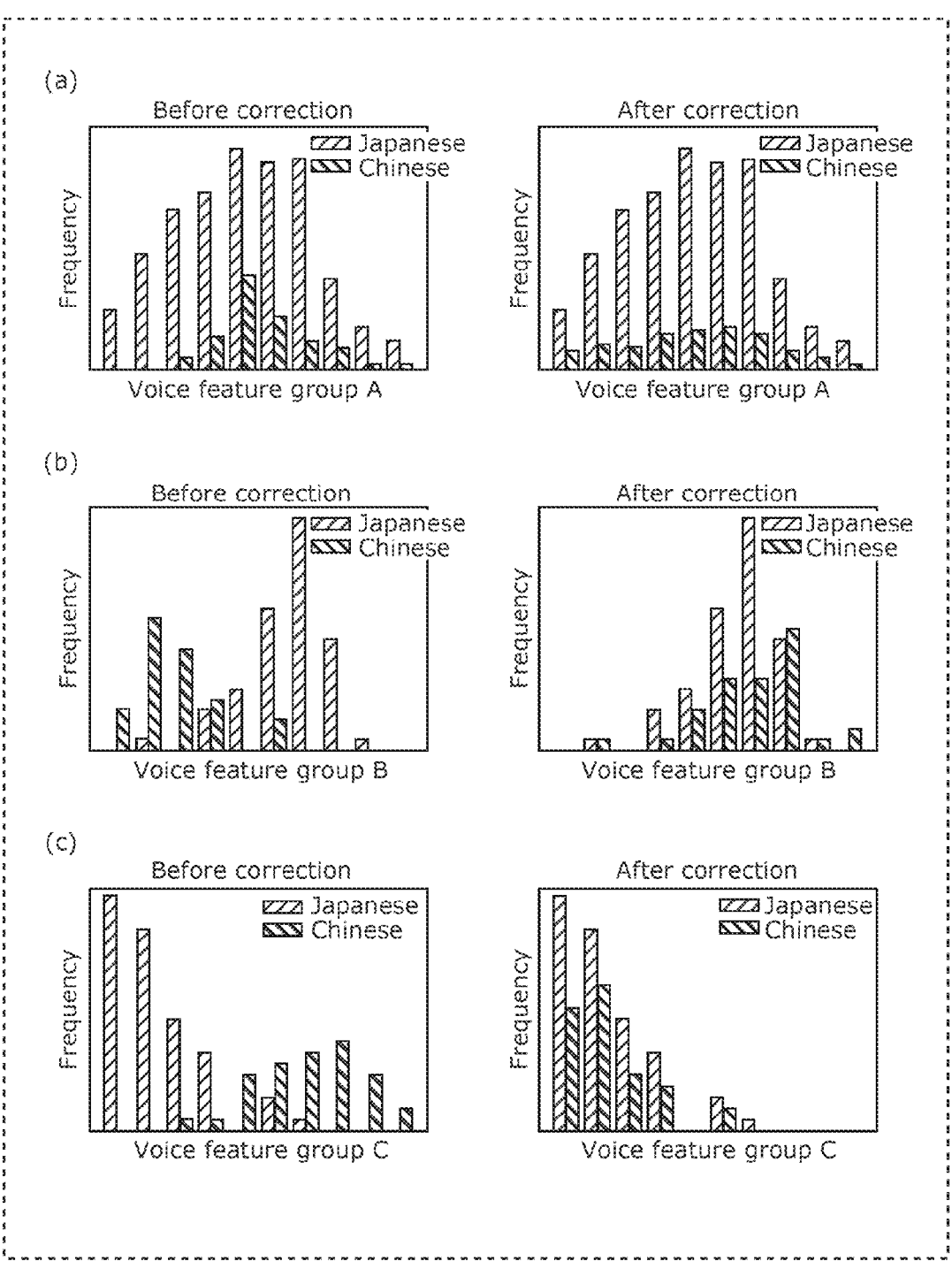
FIG. 6 is a diagram illustrating an example of distributions of voice feature groups of a plurality of persons who speak Chinese, before and after correction by a first correction method.

The coefficients calculated by generator 30 serve as coefficients for correcting frequencies of a frequency distribution of the first voice feature group. The first correction expression includes, for each of percentile sections of a frequency distribution of the first voice feature group and a frequency distribution of the second voice feature group, a coefficient for correcting a frequency of the frequency distribution of the first voice feature group. In this manner, generator 30 generates, for each of percentile sections of a frequency distribution of the first voice feature group and a frequency distribution of the second voice feature group, the first correction expression that includes a coefficient for correcting a frequency of the frequency distribution of the first voice feature group. As illustrated in FIG. 6 described later, it is understood that the first correction expression corrects frequencies of the frequency distribution of the first voice feature group (i.e., the voice feature group of the plurality of persons who speak Chinese) as illustrated in before-correction graphs and after-correction graph.

Next, a second correction expression will be described.

For example, generator 30 calculates a mean and a standard deviation of each of the frequency distributions of the first voice feature group and the second voice feature group, assuming that each frequency distribution is a normal distribution. Generator 30 then generates the second correction expression for matching the distribution of the first voice feature group to the distribution of the second voice feature group, which is shown as Expression 1 below.

$$\{(\text{Voice feature of person who speaks first language} - \quad \text{(Expression 1)}$$
$$\text{Mean of frequency distribution of first voice feature}$$
$$\text{group)/Standard deviation of frequency distribution of}$$
$$\text{first voice feature group}\} \times \text{Standard deviation of}$$
$$\text{frequency distribution of second voice feature group} +$$
$$\text{Mean of frequency distribution of second voice}$$
$$\text{feature group}$$

Figure 7:
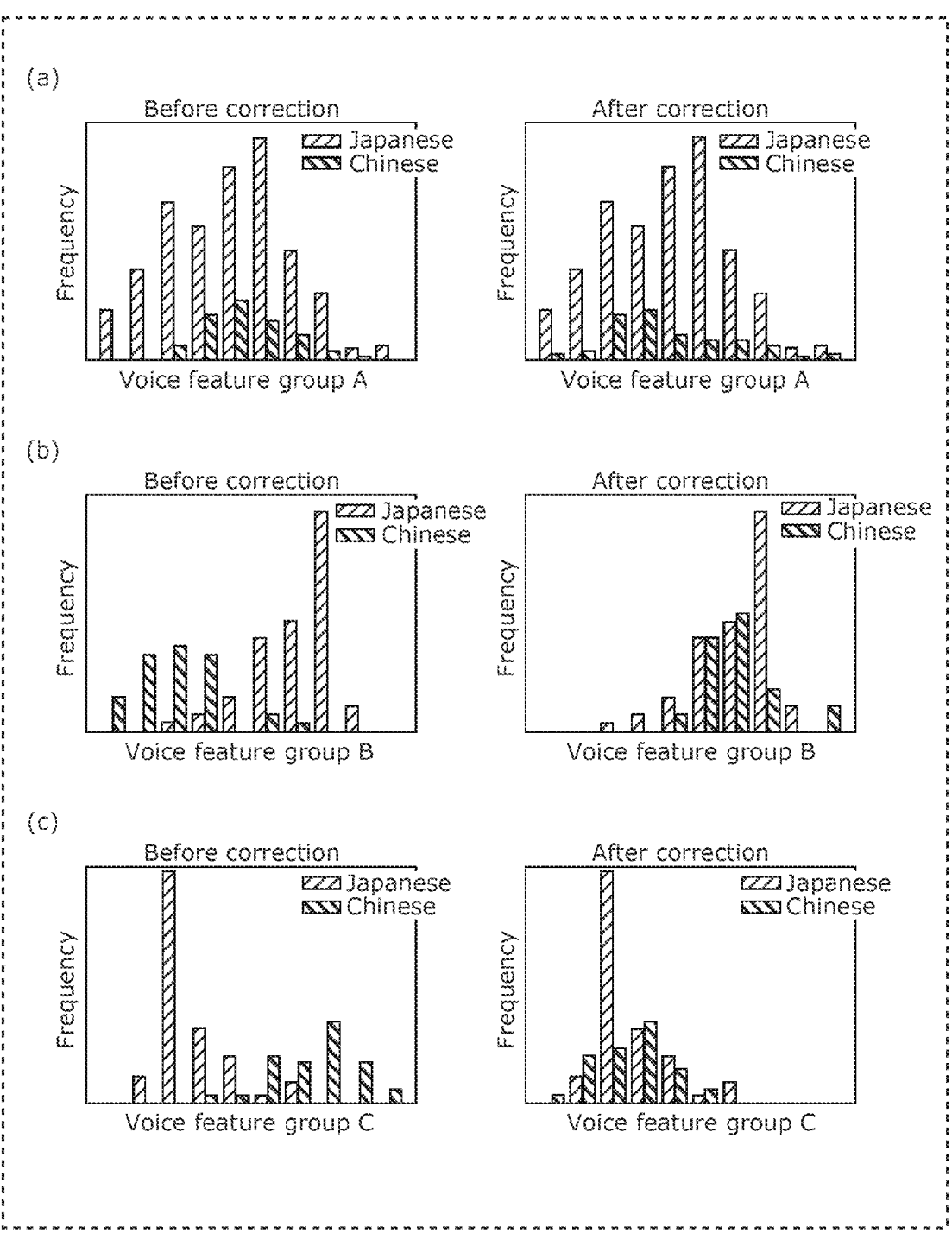
FIG. 7 is a diagram illustrating an example of distributions of voice feature groups of a plurality of persons who speak Chinese, before and after correction by a second correction method.

In this manner, generator 30 generates the second correction expression that includes the mean and the standard deviation of each of the frequency distributions of the first voice feature group and the second voice feature group. As illustrated in FIG. 7 described later, it is understood that the second correction expression corrects frequencies of the frequency distribution of the first voice feature group (i.e., the voice feature group of the plurality of persons who speak Chinese) as illustrated in before-correction graphs and after-correction graphs.

Next, a third correction expression will be described.

For example, generator 30 performs logarithmic transformation on the first voice feature group and the second voice feature group. Generator 30 next calculates a mean and a standard deviation of each of the frequency distributions of the logarithmically-transformed first voice feature group and the logarithmically-transformed second voice feature group, assuming that each frequency distribution is a normal distribution. Generator 30 then generates the third correction expression for matching the distribution of the logarithmically-transformed first voice feature group to the distribution of the logarithmically-transformed second voice feature group, which is shown as Expression 2 below.

$$\{(\text{Logarithmically-transformed voice feature of person} \quad \text{(Expression 2)}$$
$$\text{who speaks first language} - \text{Mean of frequency}$$
$$\text{distribution of logarithmically-transformed first}$$
$$\text{voice feature group)/Standard deviation of frequency}$$
$$\text{distribution of logarithmically-transformed first voice}$$
$$\text{feature group}\} \times \text{Standard deviation of frequency}$$
$$\text{distribution of logarithmically-transformed second}$$
$$\text{voice feature group} + \text{Mean of frequency distribution}$$
$$\text{of logarithmically-transformed second voice feature}$$
$$\text{group}$$

Figure 8:
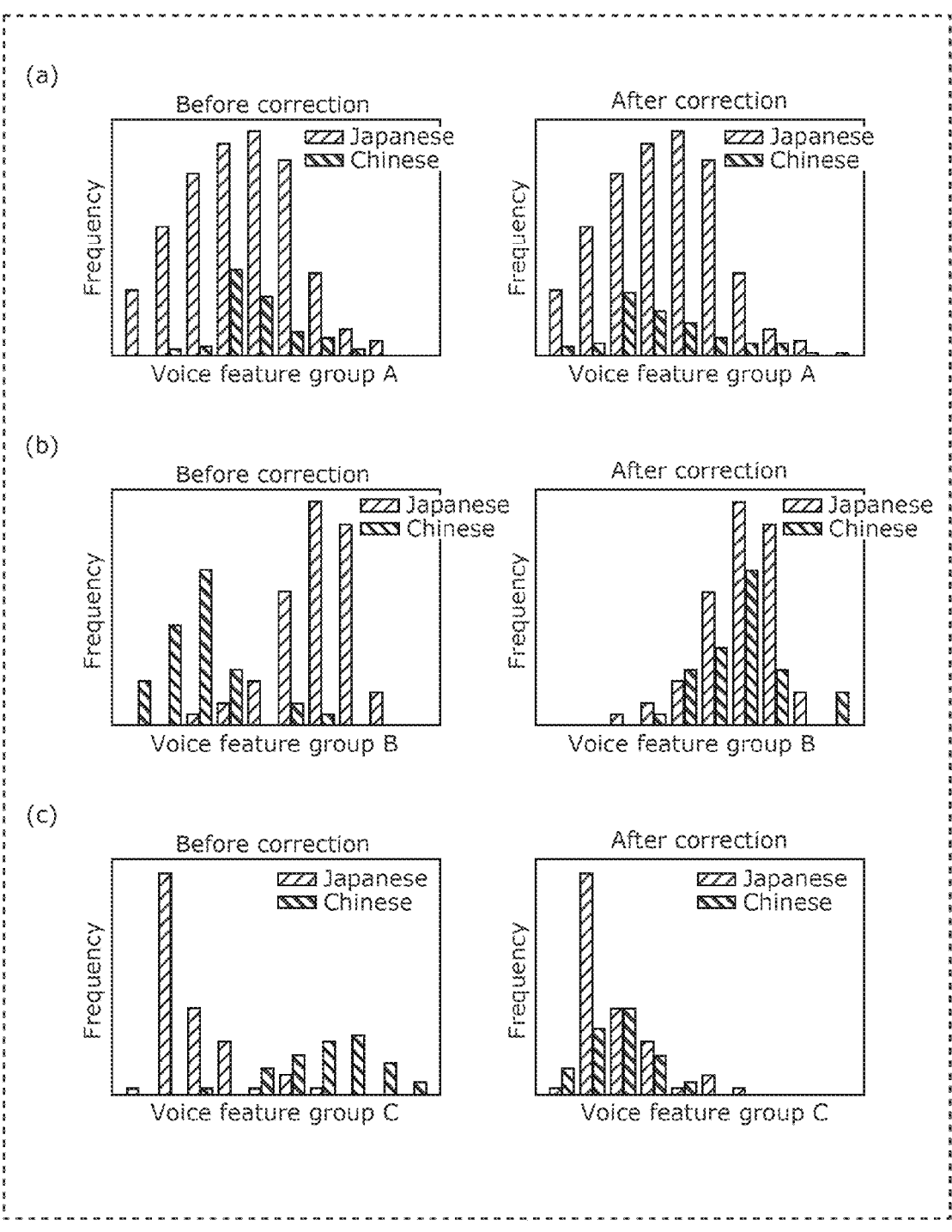
FIG. 8 is a diagram illustrating an example of distributions of voice feature groups of a plurality of persons who speak Chinese, before and after correction by a third correction method.

In this manner, generator 30 generates the third correction expression that includes the mean and the standard deviation of each of the frequency distributions of the logarithmically-transformed first voice feature group and the logarithmically-transformed second voice feature group. As illustrated in FIG. 8 described later, it is understood that the third correction expression corrects frequencies of the frequency distribution of the logarithmically-transformed first voice feature group (i.e., the logarithmically-transformed voice feature group of the plurality of persons who speak Chinese) as illustrated in before-correction graphs and after-correction graph.

A voice feature of a voice obtained from the first language sentence being spoken may include a plurality of types of voice features, and a voice feature of a voice obtained from the second language sentence being spoken may include a plurality of types of voice features. Generator 30 may generate the correction expression (a first correction expression, a second correction expression, and a third correction expression) for each of the plurality of types of voice features. For example, in the case where the types of voice features include a first formant frequency of the vowel "i" (will be referred to as voice feature group A), the number of sound pressure peaks (will be referred to as voice feature group B), a speaking time length (will be referred to as voice feature group C), and a coefficient of variation of intervals between sound pressure peaks (will be referred to as voice feature group D), generator 30 generates correction expressions (a first correction expression, a second correction expression, and a third correction expression) for voice feature group A, correction expressions (a first correction expression, a second correction expression, and a third correction expression) for voice feature group B, correction expressions (a first correction expression, a second correction expression, and a third correction expression) for voice feature group C, and correction expressions (a first correction expression, a second correction expression, and a third correction expression) for voice feature group D.

In the advance preparation phase, the correction expressions are generated in this manner using the first voice feature group of the plurality of persons who speak the first language and the second voice feature group of the plurality of persons who speak the second language.

Then, in the estimation phase, the correction expressions generated in the advance preparation phase are used to estimate the oral function or the cognitive function of subject U who speaks the first language.

First, subject voice feature obtainer 50 obtains a voice feature of subject U who speaks the first language, by analyzing a voice obtained by prompting subject U to speak the first language sentence (step S14). In other words, the voice feature of subject U, who speaks the first language, is obtained by prompting subject U to speak the first language sentence that is used for obtaining in step S11 the first voice feature group of the plurality of persons who speak the first language and is similar in pronunciation to the second language sentence.

Next, corrector 60 corrects the voice feature of subject U according to the relationship between the first voice feature group and the second voice feature group (step S15). Specifically, corrector 60 corrects the voice feature of subject U, using the correction expressions generated in the advance preparation phase. For example, corrector 60 selects a correction expression according to a type of the voice feature and corrects the voice feature of subject U using the correction expression selected. For some type of the voice feature, corrector 60 need not select a correction expression and need not correct the voice feature of subject U. Here, the selection of the correction expression will be described with reference to FIG. 6 to FIG. 9.

FIG. 6 is a diagram illustrating an example of distributions of voice feature groups (first voice feature groups) of a plurality of persons who speak Chinese, before and after correction by a first correction method. The first correction method is a correction method using the first correction expression.

The left side of (a) in FIG. 6 illustrates the distribution of a voice feature group regarding voice feature group A of the plurality of persons who speak Chinese before correction and illustrates the distribution of a voice feature group regarding voice feature group A of a plurality of persons who speak Japanese, and the right side of (a) in FIG. 6 illustrates the distribution of a voice feature group regarding voice feature group A of the plurality of persons who speak Chinese after correction with the first correction expression and illustrates the distribution of a voice feature group regarding voice feature group A of the plurality of persons who speak Japanese.

The left side of (b) in FIG. 6 illustrates the distribution of a voice feature group regarding voice feature group B of the plurality of persons who speak Chinese before correction and illustrates the distribution of a voice feature group regarding voice feature group B of a plurality of persons who speak Japanese, and the right side of (b) in FIG. 6 illustrates the distribution of a voice feature group regarding voice feature group B of the plurality of persons who speak Chinese after correction with the first correction expression and illustrates the distribution of a voice feature group regarding voice feature group B of the plurality of persons who speak Japanese.

The left side of (c) in FIG. 6 illustrates the distribution of a voice feature group regarding voice feature group C of the plurality of persons who speak Chinese before correction and illustrates the distribution of a voice feature group regarding voice feature group C of a plurality of persons who speak Japanese, and the right side of (c) in FIG. 6 illustrates the distribution of a voice feature group regarding voice feature group C of the plurality of persons who speak Chinese after correction with the first correction expression and illustrates the distribution of a voice feature group regarding voice feature group C of the plurality of persons who speak Japanese.

FIG. 7 is a diagram illustrating an example of distributions of voice feature groups (first voice feature groups) of a plurality of persons who speak Chinese, before and after correction by a second correction method. The second correction method is a correction method using the second correction expression.

The left side of (a) in FIG. 7 illustrates the distribution of a voice feature group regarding voice feature group A of the plurality of persons who speak Chinese before correction and illustrates the distribution of a voice feature group regarding voice feature group A of a plurality of persons who speak Japanese, and the right side of (a) in FIG. 7 illustrates the distribution of a voice feature group regarding voice feature group A of the plurality of persons who speak Chinese after correction with the second correction expression and illustrates the distribution of a voice feature group regarding voice feature group A of the plurality of persons who speak Japanese.

The left side of (b) in FIG. 7 illustrates the distribution of a voice feature group regarding voice feature group B of the plurality of persons who speak Chinese before correction and illustrates the distribution of a voice feature group regarding voice feature group B of a plurality of persons who speak Japanese, and the right side of (b) in FIG. 7 illustrates the distribution of a voice feature group regarding voice feature group B of the plurality of persons who speak Chinese after correction with the second correction expression and illustrates the distribution of a voice feature group regarding voice feature group B of the plurality of persons who speak Japanese.

The left side of (c) in FIG. 7 illustrates the distribution of a voice feature group regarding voice feature group C of the plurality of persons who speak Chinese before correction and illustrates the distribution of a voice feature group regarding voice feature group C of a plurality of persons who speak Japanese, and the right side of (c) in FIG. 7 illustrates the distribution of a voice feature group regarding voice feature group C of the plurality of persons who speak Chinese after correction with the second correction expression and illustrates the distribution of a voice feature group regarding voice feature group C of the plurality of persons who speak Japanese.

FIG. 8 is a diagram illustrating an example of distributions of voice feature groups (first voice feature groups) of a plurality of persons who speak Chinese, before and after correction by a third correction method. The third correction method is a correction method using the third correction expression.

The left side of (a) in FIG. 8 illustrates the distribution of a voice feature group regarding voice feature group A of the plurality of persons who speak Chinese before correction and illustrates the distribution of a voice feature group regarding voice feature group A of a plurality of persons who speak Japanese, and the right side of (a) in FIG. 8 illustrates the distribution of a voice feature group regarding voice feature group A of the plurality of persons who speak Chinese after correction with the third correction expression and illustrates the distribution of a voice feature group regarding voice feature group A of the plurality of persons who speak Japanese.

The left side of (b) in FIG. 8 illustrates the distribution of a voice feature group regarding voice feature group B of the plurality of persons who speak Chinese before correction and illustrates the distribution of a voice feature group regarding voice feature group B of a plurality of persons who speak Japanese, and the right side of (b) in FIG. 8 illustrates the distribution of a voice feature group regarding voice feature group B of the plurality of persons who speak Chinese after correction with the third correction expression and illustrates the distribution of a voice feature group regarding voice feature group B of the plurality of persons who speak Japanese.

The left side of (c) in FIG. 8 illustrates the distribution of a voice feature group regarding voice feature group C of the plurality of persons who speak Chinese before correction and illustrates the distribution of a voice feature group regarding voice feature group C of a plurality of persons who speak Japanese, and the right side of (c) in FIG. 8 illustrates the distribution of a voice feature group regarding voice feature group C of the plurality of persons who speak Chinese after correction with the third correction expression and illustrates the distribution of a voice feature group regarding voice feature group C of the plurality of persons who speak Japanese.

For example, by comparing the distributions of the first voice feature groups before and after the corrections illustrated in FIG. 6 to FIG. 8, an optimal correction expression is selected for each of the types of voice features. For example, a correction expression that can make the distribution of the first voice feature group most similar to the distribution of the second voice feature group through the correction is selected. A method for determining the similarity is not limited to a particular method. For example, the similarity can be determined using a kurtosis, a skewness, or the like of the frequency distribution. As a method for the selection, a person may check the distributions before and after the correction and select the optimal correction expression, or a computer may select the optimal correction expression automatically using the distributions before and after the correction. When the distribution of the first voice feature group before the correction is most similar to the distribution of the second voice feature group, that is, when the distribution of the first voice feature group is difficult to make more similar to the distribution of the second voice feature group, no correction expression may be selected.

In this manner, as illustrated in FIG. 9, a correction expression can be selected for each of the types of voice features.

FIG. 9 is a table showing an example of the correction expression for matching the distribution of the voice feature group (the first voice feature group) of the plurality of persons who speak Chinese to the distribution of the voice feature group of the plurality of persons who speak Japanese (the second voice feature group) for each of the types of voice features.

For example, for voice feature group A, the distribution of the first voice feature group before the correction is most similar to the distribution of the second voice feature group. Thus, no correction expression is selected, and the correction is not performed.

For example, for voice feature group B, the second correction expression is selected because the correction by the second correction expression can make the distribution of the first voice feature group most similar to the distribution of the second voice feature group. For example, a correction expression that is Expression 1 above with "Mean of frequency distribution of second voice feature group" being replaced with 28.28333333 in "Japanese_mean," "Standard deviation of frequency distribution of second voice feature group" being replaced with 4.171696964 in "Japanese_std," "Mean of frequency distribution of first voice feature group" being replaced with 15.31428571 in "Chinese_mean," and "Standard deviation of frequency distribution of first voice feature group" being replaced with 4.584267685 "Chinese_std" is selected as the second correction expression. Then, by replacing "Voice feature of person who speaks first language" of the correction expression with voice feature group B of subject U, voice feature group B of subject U can be corrected. In this manner, corrector 60 corrects the voice feature of subject U, using the mean and the standard deviation of each of the frequency distributions of the first voice feature group and the second voice feature group.

For example, for voice feature group C, the first correction expression is selected because the correction by the first correction expression can make the distribution of the first voice feature group most similar to the distribution of the second voice feature group. For example, when voice feature group C of subject U is greater than 14.822 and less than or equal to 15.538, voice feature group C of subject U is included in a percentile section that is greater than 5 percentile and less than or equal to 10 percentile. Thus, voice feature group C of subject U is corrected using the coefficient 0.432026717. Specifically, voice feature group C of subject U is corrected by multiplying voice feature group C of subject U by the coefficient. In this manner, corrector 60 corrects the voice feature of subject U, using the coefficient corresponding to a percentile section that includes the voice feature of subject U. When voice feature group C of subject U is included in a percentile section that is less than 0 percentile or a percentile section that is greater than 100 percentile, the coefficient 1 may be multiplied by (i.e., voice feature group C need not be corrected).

For example, although not shown in FIG. 6 to FIG. 8, for voice feature group D, the third correction expression is selected because the correction by the third correction expression can make the distribution of the first voice feature group most similar to the distribution of the second voice feature group. For example, a correction expression that is Expression 2 above with "Mean of frequency distribution of second voice feature group" being replaced with −2.153025672 in "Japanese_mean," "Standard deviation of frequency distribution of second voice feature group" being replaced with 0.355037126 in "Japanese_std," "Mean of frequency distribution of first voice feature group" being replaced with −1.589782595 in "Chinese_mean," and "Standard deviation of frequency distribution of first voice feature group" being replaced with 0.645520591 "Chinese_std" is selected as the third correction expression. Then, by replacing "Voice feature of person who speaks first language" of the correction expression with the logarithmically-transformed voice feature group D of subject U, the logarithmically-transformed voice feature group D of subject U can be corrected. By performing exponential transformation on the logarithmically-transformed voice feature group D of subject U that has been corrected, voice feature group D of subject U that has been corrected and is not logarithmically-transformed can be obtained. In this manner, corrector 60 performs logarithmic transformation on voice feature group D of subject U, corrects the logarithmically-transformed voice feature group D of subject U, using the mean and the standard deviation of the frequency distribution of each of the logarithmically-transformed first voice feature group and the logarithmically-transformed second voice feature group, and performs exponential transformation on the logarithmically-transformed voice feature group D of subject U that has been corrected.

Returning to the description of FIG. 5, estimator 70 estimates, from the voice feature of subject U that has been corrected, an oral function or a cognitive function of subject U by using an estimation process for an oral function or a cognitive function based on the second language (step S16). By the correction, the voice feature of subject U who speaks the first language is approximated to a voice feature of a person who speaks the second language. Thus, an estimation process for an oral function or a cognitive function based on the second language can be applied to the corrected voice feature of subject U who speaks the first language. Therefore, it is possible to estimate an oral function and a cognitive function of subject U from the voice feature of subject U with high accuracy.

The estimation process for an oral function based on the second language is, for example, a process that is performed based on a result of evaluation that is performed in advance on a plurality of persons who speak the second language. Specifically, voice features of the plurality of persons who speak the second language are collected, and oral functions of the plurality of persons are actually diagnosed. By using a correlation between the voice features of the plurality of persons who speak the second language and a result of the actual diagnoses, the oral function of subject U can be estimated. For example, in order to express the correlation between the voice feature and the result of the diagnoses, machine learning may be used. Techniques of the machine learning include logistic regression, support vector machine (SVM), and random forest.

The estimation process for a cognitive function based on the second language is, for example, a process that is performed based on voice features (e.g., a pitch relating to a voice pitch, formant frequencies relating to properties of a vowel and a consonant, Mel-frequency cepstral coefficients (MFCCs) relating to properties of a vocal tract, etc.) of a plurality of persons who speak the second language. For estimating the cognitive function, for example, a rule base, an SVM, which is one of techniques of machine learning, or a trained model such as a neural network can be used. For example, the voice features may be any features with which cognitive dysfunction can be estimated, and with which a prosody feature of a voice can be identified. The voice features include, for example, the pitch, the formant frequencies, the Mel-frequency cepstral coefficients, or the like, or a combination of them.

Next, outputter 80 outputs a result of estimation of the oral function or the cognitive function of subject U (e.g., a state of the oral function or the cognitive function of subject U) (step S17). For example, outputter 80 outputs the result of estimation to suggester 90.

Outputter 80 may output the result of estimation to mobile terminal 300 or the like. Accordingly, subject U or a person concerned (a family member, doctor, carer, etc.) of subject U can check the state of the oral function or the cognitive function of subject U.

Suggester 90 then provides a suggestion regarding the oral function or the cognitive function for subject U by checking the result of estimation against predetermined data (step S18). The predetermined data (suggestion data) is data in which details of suggestion are associated with each of states of an oral function or a cognitive function. For example, suggester 90 provides a suggestion suitable to the state of the oral function or the cognitive function of subject U (e.g., a suggestion regarding meal, or a suggestion regarding exercise, etc.), using data such as an image, a video, a voice, or a text indicating details of suggestion stored in storage 40.

The case where the correction expression for correcting the voice feature of subject U is generated in step S13 has been described above. Next, the case where a trained model for correcting the voice feature of subject U is generated in step S13 will be described.

Generator 30 generates a trained model for approximating a voice feature of a voice obtained from the first language sentence being spoken to a voice feature of a voice obtained from the second language sentence being spoken, by teaching the relationship between the first voice feature group and the second voice feature group. For example, generator 30 can generate the trained model by obtaining the voice features of the voices of speaking the first language sentence (e.g., a clause or a fixed phrase in Chinese) and the second language sentence (e.g., a clause or a fixed phrase in Japanese) that include similar pronunciations as shown in Table 1 to Table 4 and performing teaching using the voice feature corresponding to the first language sentence as input data and the voice feature corresponding to the second language sentence as ground truth data.

The voice feature of the voice obtained from the first language sentence being spoken may include a plurality of types of voice features, and the voice feature of the voice obtained from the second language sentence being spoken may include a plurality of types of voice features. Generator 30 may generate the trained model for each of the plurality of types of voice features. For example, each of the types of voice features corresponds to a clause or a fixed phrase spoken. By prompting a plurality of persons to speak various clauses or fixed phrases, various types of voice features can be obtained, and a trained model can be generated for each of the types of voice features. For example, in the case where the types of voice features include voice feature group A to voice feature group D, generator 30 generates a trained model corresponding to voice feature group A, a trained model corresponding to voice feature group B, a trained model corresponding to voice feature group C, and a trained model corresponding to voice feature group D. It should be noted that a plurality of types of voice features may correspond to one trained model.

As in the case where the correction expression is generated, a voice feature of subject U is obtained in step S14.

In step S15, corrector 60 corrects the voice feature of subject U using the trained model generated in the advance preparation phase. For example, corrector 60 selects the trained model according to the type of a voice feature, and corrects the voice feature of subject U using the trained model selected.

Then, as in the case where the correction expression is generated, a process including step S16 to step S18 is performed.

Advantageous Effects Etc

As described above, an estimation method according to the present embodiment is an estimation method executed by estimation device 100 that estimates an oral function or a cognitive function. As illustrated in FIG. 5, the estimation method includes: obtaining a voice feature group of a plurality of persons who speak a first language, by analyzing voices obtained by prompting the plurality of persons who speak the first language to speak a first language sentence that is in the first language and is similar in pronunciation to a second language sentence spoken in a second language different from the first language (step S11); obtaining a voice feature group of a plurality of persons who speak the second language, by analyzing voices obtained by prompting the plurality of persons who speak the second language to speak the second language sentence (step S12); obtaining a voice feature of subject U who speaks the first language, by analyzing a voice obtained by prompting subject U to speak the first language sentence (step S14); correcting the voice feature of subject U according to a relationship between the voice feature group of the plurality of persons who speak the first language and the voice feature group of the plurality of persons who speak the second language (step S15); estimating, from the voice feature of subject U that has been corrected, an oral function or a cognitive function of subject U by using an estimation process for an oral function or a cognitive function based on the second language (step S16); and outputting a result of estimation of the oral function or the cognitive function of subject U (step S17).

The first voice feature group and the second voice feature group show differences attributable to differences between the languages. To deal with this, according to the relationship between the first voice feature group and the second voice feature group, the first voice feature group can be corrected such that the differences between the first voice feature group and the second voice feature group are reduced. Then, by correcting the voice feature of subject U who speaks the first language in the same manner, the voice feature of subject U who speaks the first language can be corrected to be a voice feature of a person who speaks the second language. As a result, the estimation process for an oral function or a cognitive function based on the second language can be applied to the corrected voice feature of subject U who speaks the first language. Therefore, it is possible to estimate an oral function and a cognitive function of subject U who speaks the first language as with the voice feature of the person who speaks the second language. In this manner, even when an estimation process for an oral function or a cognitive function based on a specific language is applied to a language different from the specific language, it is possible to inhibit a decrease in accuracy of estimation.

For example, the estimation method may further include generating a correction expression for matching a distribution of the voice feature group of the plurality of persons who speak the first language to a distribution of the voice feature group of the plurality of persons who speak the second language, according to the relationship between the voice feature group of the plurality of persons who speak the first language and the voice feature group of the plurality of persons who speak the second language (step S13 in FIG. 5). In the correcting, the voice feature of subject U may be corrected using the correction expression.

Accordingly, the correction expression for matching the distribution of the first voice feature group to the distribution of the second voice feature group can be generated according to the relationship between the first voice feature group and the second voice feature group. With the correction expression, the voice feature of subject U can be corrected to be approximated to the voice feature of a person who speaks the second language.

For example, a voice feature of a voice obtained from the first language sentence being spoken may include a plurality of types of voice features, and a voice feature of a voice obtained from the second language sentence being spoken may include a plurality of types of voice features. In the generating of the correction expression, the correction expression may be generated for each of the plurality of types of voice features, and in the correcting, the correction expression may be selected according to a type of a voice feature, and the voice feature of subject U may be corrected using the correction expression selected.

The voice features include various types of voice features such as speech rate, sound pressure difference, change over time in the sound pressure difference, formant frequency, ratio between formant frequencies, change in the formant frequency, time length of mouth opening, time length of mouth closure, time length of a plosive, articulation time length, standard deviation of pause time lengths. Different types of voice features enable estimation of different oral functions or cognitive functions. An optimal correction expression differs according to a type of a voice feature. Thus, by selecting an optimal correction expression according to a type of a voice feature and correcting the voice feature of subject U using the correction expression selected, an oral function or a cognitive function corresponding to the type of the voice feature can be estimated.

For example, the correction expression may include, for each of percentile sections of a frequency distribution of the voice feature group of the plurality of persons who speak the first language and a frequency distribution of the voice feature group of the plurality of persons who speak the second language, a coefficient for correcting a frequency of the frequency distribution of the voice feature group of the plurality of persons who speak the first language. In the correcting, the voice feature of subject U may be corrected using the coefficient corresponding to a percentile section that includes the voice feature of subject U.

The differences between the first voice feature group and the second voice feature group have a tendency in each percentile section. Therefore, by correcting the voice feature of subject U using a coefficient corresponding to a percentile section including the voice feature of subject U in this manner, the voice feature of subject U can be corrected to be the voice feature of a person who speaks the second language.

For example, the correction expression may include means and standard deviations of frequency distributions of the voice feature group of the plurality of persons who speak the first language and the voice feature group of the plurality of persons who speak the second language. In the correcting, the voice feature of subject U may be corrected using the means and the standard deviations.

In this manner, by using the mean and the standard deviation of each of the frequency distributions of the first voice feature group and the second voice feature group, the distribution of the first voice feature group can be matched to the distribution of the second voice feature group.

For example, the generating of the correction expression may include: performing logarithmic transformation on the voice feature group of the plurality of persons who speak the first language and the voice feature group of the plurality of persons who speak the second language to obtain a logarithmically-transformed voice feature group of the plurality of persons who speak the first language and a logarithmically-transformed voice feature group of the plurality of persons who speak the second language; and generating the correction expression for matching a distribution of the logarithmically-transformed voice feature group of the plurality of persons who speak the first language to a distribution of the logarithmically-transformed voice feature group of the plurality of persons who speak the second language, according to a relationship between the logarithmically-transformed voice feature group of the plurality of persons who speak the first language and the logarithmically-transformed voice feature group of the plurality of persons who speak the second language. The correction expression may include means and standard deviations of frequency distributions of the logarithmically-transformed voice feature group of the plurality of persons who speak the first language and the logarithmically-transformed voice feature group of the plurality of persons who speak the second language. The correcting may include: performing logarithmic transformation on the voice feature of subject U to obtain a logarithmically-transformed voice feature of subject U; correcting the logarithmically-transformed voice feature of subject U by using the means and the standard deviations; and performing exponential transformation on the logarithmically-transformed voice feature of subject U that has been corrected.

In this manner, by using the logarithmic transformation and the exponential transformation, the accuracy of the correction may be successfully increased.

For example, the estimation method may further include generating a trained model for approximating a voice feature of a voice obtained from the first language sentence being spoken to a voice feature of a voice obtained from the second language sentence being spoken, by teaching the relationship between the voice feature group of the plurality of persons who speak the first language and the voice feature group of the plurality of persons who speak the second language (step S13 in FIG. 5). In the correcting, the voice feature of subject U may be corrected using the trained model.

Accordingly, it is possible to generate a trained model for approximating a voice feature of a voice obtained from the first language sentence being spoken to a voice feature of a voice obtained from the second language sentence being spoken, by teaching the relationship between the first voice feature group and the second voice feature group, and it is possible, using the trained model, to perform correction to approximate the voice feature of subject U to the voice feature of a person who speaks the second language.

For example, the voice feature of the voice obtained from the first language sentence being spoken may include a plurality of types of voice features, and the voice feature of the voice obtained from the second language sentence being spoken may include a plurality of types of voice features. In the generating of the trained model, the trained model may be generated for each of the plurality of types of voice features, and in the correcting, the trained model may be selected according to a type of a voice feature, and the voice feature of subject U may be corrected using the trained model selected.

The voice features include various types of voice features, and different types of voice features enable estimation of different oral functions or cognitive functions. An optimal trained model differs according to a type of a voice feature. Thus, by selecting an optimal trained model according to a type of a voice feature and correcting the voice feature of subject U using the trained model selected, an oral function or a cognitive function corresponding to the type of the voice feature can be estimated.

For example, the estimation method may further include: providing a suggestion regarding the oral function or the cognitive function for subject U by checking the result of estimation against predetermined data.

Accordingly, subject U or the like can be provided with a suggestion about how to take measures against a decline in the oral function or the cognitive function.

Estimation device 100 according to the present embodiment is a device that estimates an oral function or a cognitive function, and includes: first voice feature group obtainer 10 that obtains a voice feature group of a plurality of persons who speak a first language, by analyzing voices obtained by prompting the plurality of persons who speak the first language to speak a first language sentence that is in the first language and is similar in pronunciation to a second language sentence spoken in a second language different from the first language; second voice feature group obtainer 20 that obtains a voice feature group of a plurality of persons who speak the second language, by analyzing voices obtained by prompting the plurality of persons who speak the second language to speak the second language sentence; subject voice feature obtainer 50 that obtains a voice feature of subject U who speaks the first language, by analyzing a voice obtained by prompting subject U to speak the first language sentence; corrector 60 that corrects the voice feature of subject U according to a relationship between the voice feature group of the plurality of persons who speak the first language and the voice feature group of the plurality of persons who speak the second language; estimator 70 that estimates, from the voice feature of subject U that has been corrected, an oral function or a cognitive function of subject U by using an estimation process for an oral function or a cognitive function based on the second language; and outputter 80 that outputs a result of estimation of the oral function or the cognitive function of subject U.

Accordingly, it is possible to provide estimation device 100 capable of inhibiting a decrease in accuracy of estimation even when an estimation process for an oral function or a cognitive function based on a specific language is applied to a language different from the specific language.

Other Embodiments

The estimation method and so on according to the embodiment have been described above, but the present invention is not limited to the above embodiment.

For example, evaluation results on oral functions or cognitive functions may be accumulated together with personal information items as big data, and the big data may be used for machine learning. Furthermore, details of suggestions regarding oral functions or cognitive functions may be accumulated together with personal information items as big data, and the big data may be used for machine learning.

For example, although the estimation method in the above embodiment includes providing a suggestion regarding an oral function or a cognitive function (step S18), this process need not be included. In other words, estimation device 100 need not include suggester 90.

For example, the steps included in the estimation method may be executed by a computer (a computer system). The present invention can be implemented as a program for causing a computer to execute the steps included in the estimation method. In addition, the present invention can be implemented as a non-transitory computer-readable recording medium such as a CD-ROM having such a program recorded thereon.

For example, in the case where the present invention is implemented using a program (a software product), each step is performed as a result of the program being executed using hardware resources such as a CPU, memory, and an input and output circuit of a computer. That is to say, each step is performed by the CPU obtaining data from, for example, the memory or the input and output circuit and performing calculation on the data, and outputting the calculation result to the memory or the input and output circuit, for example.

Further, each of the constituent elements included in estimation device 100 according to the above embodiment may be implemented as a dedicated or general-purpose circuit.

Further, each of the constituent elements included in estimation device 100 according to the above embodiment may be implemented as a large-scale integrated (LSI) circuit, which is an integrated circuit (IC).

Such IC is not limited to an LSI, and thus may be implemented as a dedicated circuit or a general-purpose processor. A field programmable gate array (FPGA) that allows for programming, or a reconfigurable processor that allows for reconfiguration of the connection and the setting of circuit cells inside an LSI may be employed.

Furthermore, when advancement in semiconductor technology or derivatives of other technologies brings forth a circuit integration technology which replaces LSI, it will be appreciated that such a circuit integration technology may be used to integrate the constituent elements included in estimation device 100.

The present invention also includes other forms achieved by making various modifications to the embodiments that may be conceived by those skilled in the art, as well as forms implemented by arbitrarily combining the constituent elements and functions in each embodiment without materially departing from the essence of the present invention.

It should be noted that the present description discloses the following matters.

(1) An estimation method executed by an estimation device that estimates an oral function or a cognitive function, the estimation method including: obtaining a voice feature group of a plurality of persons who speak a first language, by analyzing voices obtained by prompting the plurality of persons who speak the first language to speak a first language sentence that is in the first language and is similar in pronunciation to a second language sentence spoken in a second language different from the first language; obtaining a voice feature group of a plurality of persons who speak the second language, by analyzing voices obtained by prompting the plurality of persons who speak the second language to speak the second language sentence;

obtaining a voice feature of a subject who speaks the first language, by analyzing a voice obtained by prompting the subject to speak the first language sentence; correcting the voice feature of the subject according to a relationship between the voice feature group of the plurality of persons who speak the first language and the voice feature group of the plurality of persons who speak the second language; estimating, from the voice feature of the subject that has been corrected, an oral function or a cognitive function of the subject by using an estimation process for an oral function or a cognitive function based on the second language; and outputting a result of estimation of the oral function or the cognitive function of the subject.

(2) The estimation method according to (1), further including: generating a correction expression for matching a distribution of the voice feature group of the plurality of persons who speak the first language to a distribution of the voice feature group of the plurality of persons who speak the second language, according to the relationship between the voice feature group of the plurality of persons who speak the first language and the voice feature group of the plurality of persons who speak the second language, wherein in the correcting, the voice feature of the subject is corrected using the correction expression.

(3) The estimation method according to (2), wherein a voice feature of a voice obtained from the first language sentence being spoken includes a plurality of types of voice features, a voice feature of a voice obtained from the second language sentence being spoken includes a plurality of types of voice features, in the generating of the correction expression, the correction expression is generated for each of the plurality of types of voice features, and in the correcting, the correction expression is selected according to a type of a voice feature, and the voice feature of the subject is corrected using the correction expression selected.

(4) The estimation method according to (2) or (3), wherein the correction expression includes, for each of percentile sections of a frequency distribution of the voice feature group of the plurality of persons who speak the first language and a frequency distribution of the voice feature group of the plurality of persons who speak the second language, a coefficient for correcting a frequency of the frequency distribution of the voice feature group of the plurality of persons who speak the first language, and in the correcting, the voice feature of the subject is corrected using the coefficient corresponding to a percentile section that includes the voice feature of the subject.

(5) The estimation method according to (2) or (3), wherein the correction expression includes means and standard deviations of frequency distributions of the voice feature group of the plurality of persons who speak the first language and the voice feature group of the plurality of persons who speak the second language, and in the correcting, the voice feature of the subject is corrected using the means and the standard deviations.

(6) The estimation method according to (5), wherein the generating of the correction expression includes: performing logarithmic transformation on the voice feature group of the plurality of persons who speak the first language and the voice feature group of the plurality of persons who speak the second language to obtain a logarithmically-transformed voice feature group of the plurality of persons who speak the first language and a logarithmically-transformed voice feature group of the plurality of persons who speak the second language; and generating the correction expression for matching a distribution of the logarithmically-transformed voice feature group of the plurality of persons who speak the first language to a distribution of the logarithmically-transformed voice feature group of the plurality of persons who speak the second language, according to a relationship between the logarithmically-transformed voice feature group of the plurality of persons who speak the first language and the logarithmically-transformed voice feature group of the plurality of persons who speak the second language, the correction expression includes means and standard deviations of frequency distributions of the logarithmically-transformed voice feature group of the plurality of persons who speak the first language and the logarithmically-transformed voice feature group of the plurality of persons who speak the second language, and the correcting includes: performing logarithmic transformation on the voice feature of the subject to obtain a logarithmically-transformed voice feature of the subject; correcting the logarithmically-transformed voice feature of the subject by using the means and the standard deviations; and performing exponential transformation on the logarithmically-transformed voice feature of the subject that has been corrected.

(7) The estimation method according to (1), further including: generating a trained model for approximating a voice feature of a voice obtained from the first language sentence being spoken to a voice feature of a voice obtained from the second language sentence being spoken, by teaching the relationship between the voice feature group of the plurality of persons who speak the first language and the voice feature group of the plurality of persons who speak the second language, wherein in the correcting, the voice feature of the subject is corrected using the trained model.

(8) The estimation method according to (7), wherein the voice feature of the voice obtained from the first language sentence being spoken includes a plurality of types of voice features, the voice feature of the voice obtained from the second language sentence being spoken includes a plurality of types of voice features, in the generating of the trained model, the trained model is generated for each of the plurality of types of voice features, and in the correcting, the trained model is selected according to a type of a voice feature, and the voice feature of the subject is corrected using the trained model selected.

(9) The estimation method according to any one of (1) to (8), further including: providing a suggestion regarding the oral function or the cognitive function for the subject by checking the result of estimation against predetermined data.

(10) A non-transitory computer-readable recording medium having recorded thereon a program for causing a computer to execute the estimation method according to any one of (1) to (9).

(11) An estimation device that estimates an oral function or a cognitive function, the estimation device including: a first voice feature group obtainer that obtains a voice feature group of a plurality of persons who speak a first language, by analyzing voices obtained by prompting the plurality of persons who speak the first language to speak a first language sentence that is in the first language and is similar in pronunciation to a second language sentence spoken in a second language different from the first language; a second voice feature group obtainer that obtains a voice feature group of a plurality of persons who speak the second language, by analyzing voices obtained by prompting the plurality of persons who speak the second language to speak the second language sentence; a subject voice feature obtainer that obtains a voice feature of a subject who speaks the first language, by analyzing a voice obtained by prompting the subject to speak the first language sentence; a corrector that corrects the voice feature of the subject according to a relationship between the voice feature group of the plurality of persons who speak the first language and the voice feature group of the plurality of persons who speak the second language; an estimator that estimates, from the voice feature of the subject that has been corrected, an oral function or a cognitive function of the subject by using an estimation process for an oral function or a cognitive function based on the second language; and an outputter that outputs a result of estimation of the oral function or the cognitive function of the subject.

The invention claimed is:

1. An estimation method executed by an estimation system, comprising an estimation device and a terminal, that estimates an oral function or a cognitive function, the estimation method, performed by the estimation device, comprising:

obtaining, a voice feature group of a plurality of persons who speak a first language, by analyzing voices obtained by prompting the plurality of persons who speak the first language to speak a first language sentence that is in the first language and is similar in pronunciation to a second language sentence spoken in a second language different from the first language;

obtaining a voice feature group of a plurality of persons who speak the second language, by analyzing voices obtained by prompting the plurality of persons who speak the second language to speak the second language sentence;

obtaining a voice feature of a subject who speaks the first language, by analyzing a voice obtained by a microphone provided in the terminal and prompting the subject to speak the first language sentence;

correcting the voice feature of the subject according to a relationship between the voice feature group of the plurality of persons who speak the first language and the voice feature group of the plurality of persons who speak the second language;

estimating, from the voice feature of the subject that has been corrected, an oral function or a cognitive function of the subject by using an estimation process for an oral function or a cognitive function based on the second language; and outputting, to a display provided in the terminal, a result of estimation of the oral function or the cognitive function of the subject.

2. The estimation method according to claim 1, further comprising:

generating a correction expression for matching a distribution of the voice feature group of the plurality of persons who speak the first language to a distribution of the voice feature group of the plurality of persons who speak the second language, according to the relationship between the voice feature group of the plurality of persons who speak the first language and the voice feature group of the plurality of persons who speak the second language, wherein in the correcting, the voice feature of the subject is corrected using the correction expression.

3. The estimation method according to claim 2, wherein a voice feature of a voice obtained from the first language sentence being spoken includes a plurality of types of voice features, a voice feature of a voice obtained from the second language sentence being spoken includes a plurality of types of voice features, in the generating of the correction expression, the correction expression is generated for each of the plurality of types of voice features, and in the correcting, the correction expression is selected according to a type of a voice feature, and the voice feature of the subject is corrected using the correction expression selected.

4. The estimation method according to claim 2, wherein the correction expression includes, for each of percentile sections of a frequency distribution of the voice feature group of the plurality of persons who speak the first language and a frequency distribution of the voice feature group of the plurality of persons who speak the second language, a coefficient for correcting a frequency of the frequency distribution of the voice feature group of the plurality of persons who speak the first language, and in the correcting, the voice feature of the subject is corrected using the coefficient corresponding to a percentile section that includes the voice feature of the subject.

5. The estimation method according to claim 2, wherein the correction expression includes means and standard deviations of frequency distributions of the voice feature group of the plurality of persons who speak the first language and the voice feature group of the plurality of persons who speak the second language, and in the correcting, the voice feature of the subject is corrected using the means and the standard deviations.

6. The estimation method according to claim 5, wherein the generating of the correction expression includes:

performing logarithmic transformation on the voice feature group of the plurality of persons who speak the first language and the voice feature group of the plurality of persons who speak the second language to obtain a logarithmically-transformed voice feature group of the plurality of persons who speak the first language and a logarithmically-transformed voice feature group of the plurality of persons who speak the second language; and generating the correction expression for matching a distribution of the logarithmically-transformed voice feature group of the plurality of persons who speak the first language to a distribution of the logarithmically-transformed voice feature group of the plurality of persons who speak the second language, according to a relationship between the logarithmically-transformed voice feature group of the plurality of persons who speak the first language and the logarithmically-transformed voice feature group of the plurality of persons who speak the second language, the correction expression includes means and standard deviations of frequency distributions of the logarithmically-transformed voice feature group of the plurality of persons who speak the first language and the logarithmically-transformed voice feature group of the plurality of persons who speak the second language, and the correcting includes:

performing logarithmic transformation on the voice feature of the subject to obtain a logarithmically-transformed voice feature of the subject;

correcting the logarithmically-transformed voice feature of the subject by using the means and the standard deviations; and performing exponential transformation on the logarithmically-transformed voice feature of the subject that has been corrected.

7. The estimation method according to claim 1, further comprising:

generating a trained model for approximating a voice feature of a voice obtained from the first language sentence being spoken to a voice feature of a voice obtained from the second language sentence being spoken, by teaching the relationship between the voice feature group of the plurality of persons who speak the first language and the voice feature group of the plurality of persons who speak the second language, wherein in the correcting, the voice feature of the subject is corrected using the trained model.

8. The estimation method according to claim 7, wherein the voice feature of the voice obtained from the first language sentence being spoken includes a plurality of types of voice features, the voice feature of the voice obtained from the second language sentence being spoken includes a plurality of types of voice features, in the generating of the trained model, the trained model is generated for each of the plurality of types of voice features, and in the correcting, the trained model is selected according to a type of a voice feature, and the voice feature of the subject is corrected using the trained model selected.

9. The estimation method according to claim 1, further comprising:

providing a suggestion regarding the oral function or the cognitive function for the subject by checking the result of estimation against predetermined data.

10. A non-transitory computer-readable recording medium having recorded thereon a program for causing a computer to execute the estimation method according to claim 1.

11. An estimation system that estimates an oral function or a cognitive function, the estimation system comprising an estimation device and a terminal, and the estimation device comprising:

a processor configured to perform operations comprising:

obtaining a voice feature group of a plurality of persons who speak a first language, by analyzing voices obtained by prompting the plurality of persons who speak the first language to speak a first language sentence that is in the first language and is similar in pronunciation to a second language sentence spoken in a second language different from the first language;

obtaining a voice feature group of a plurality of persons who speak the second language, by analyzing voices obtained by prompting the plurality of persons who speak the second language to speak the second language sentence;

obtaining a voice feature of a subject who speaks the first language, by analyzing a voice obtained by a microphone provided in the terminal and prompting the subject to speak the first language sentence;

correcting the voice feature of the subject according to a relationship between the voice feature group of the plurality of persons who speak the first language and the voice feature group of the plurality of persons who speak the second language;

estimating, from the voice feature of the subject that has been corrected, an oral function or a cognitive function of the subject by using an estimation process for an oral function or a cognitive function based on the second language; and outputting, to a display provided in the terminal, a result of estimation of the oral function or the cognitive function of the subject.

\* \* \* \* \*